US 11,628,806 B2

(12) United States Patent
Kracker et al.

(10) Patent No.: US 11,628,806 B2
(45) Date of Patent: Apr. 18, 2023

(54) SYSTEMS AND METHODS FOR CALIBRATING A WINDSHIELD WIPER SYSTEM

(71) Applicant: Honda Motor Co., Ltd., Tokyo (JP)

(72) Inventors: Thomas G. Kracker, Marysville, OH (US); Joshua Thomas Glazier, Marysville, OH (US); Erik F. De Almeida, Dublin, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 600 days.

(21) Appl. No.: 16/690,931

(22) Filed: Nov. 21, 2019

(65) Prior Publication Data

US 2021/0155203 A1    May 27, 2021

(51) Int. Cl.
| | | |
|---|---|---|
| *B60S 1/04* | (2006.01) | |
| *B60S 1/34* | (2006.01) | |
| *B60S 1/06* | (2006.01) | |
| *B60S 1/08* | (2006.01) | |
| *B60S 1/16* | (2006.01) | |

(52) U.S. Cl.
CPC ........... *B60S 1/0469* (2013.01); *B60S 1/0452* (2013.01); *B60S 1/06* (2013.01); *B60S 1/08* (2013.01); *B60S 1/0807* (2013.01); *B60S 1/0818* (2013.01); *B60S 1/163* (2013.01); *B60S 1/34* (2013.01)

(58) Field of Classification Search
CPC .... B60S 1/0452; B60S 1/0469; B60S 1/0818; B60S 1/163; B60S 1/0862; B60S 1/0807; B60S 1/0461; B60S 1/0463
USPC ........ 15/250.13, 250.12; 701/49; 318/DIG. 2
See application file for complete search history.

(56) References Cited

U.S. PATENT DOCUMENTS

| | | | | |
|---|---|---|---|---|
| 6,249,098 | B1* | 6/2001 | Miyazaki | B60S 1/08 318/443 |
| 8,005,590 | B2* | 8/2011 | Ikeda | B60S 1/08 318/DIG. 2 |
| 9,061,657 | B2 | 6/2015 | Natsume | |
| 2017/0313284 | A1* | 11/2017 | Koike | B60S 1/0452 |
| 2018/0370491 | A1 | 12/2018 | Brown et al. | |
| 2019/0322244 | A1* | 10/2019 | Ootani | B60S 1/18 |

FOREIGN PATENT DOCUMENTS

| | | |
|---|---|---|
| CN | 106364454 A | 2/2017 |
| WO | 2017186552 A1 | 11/2017 |

* cited by examiner

*Primary Examiner* — Gary K. Graham
(74) *Attorney, Agent, or Firm* — Armstrong Teasdale LLP

(57) ABSTRACT

A method of calibrating a windshield wiper system that includes moving a wiper arm, of the windshield wiper system, within at least a portion of a full range of motion defined by at least one physical boundary, determining a position of the wiper arm when it contacts the at least one physical boundary, defining, based on the determined position of the wiper arm, an operating range of motion for the wiper arm that is shorter than the full range of motion, and setting the wiper arm to operate within the defined operating range of motion.

14 Claims, 3 Drawing Sheets

SYSTEMS AND METHODS FOR CALIBRATING A WINDSHIELD WIPER SYSTEM

BACKGROUND

The present disclosure relates generally to windshield wiper systems and, more specifically, to systems and methods for setting an operating range of motion for windshield wiper systems.

Conventionally, a vehicle such as an automobile is equipped with a wiper device, which wipes off rainwater and dust, for example, that collects on a windshield of the vehicle to ensure the view of a driver through the windshield is unobstructed. Known wiper devices include a wiper arm that is rotatably driven by a drive system including a motor, and a wiper blade attached to the wiper arm. In operation, the motor swings the wiper arm and blade through a reciprocating range of motion across the windshield. In at least some known wiper devices, the range of motion is defined by a mechanical device such as a cam plate. For example, the motor typically operates in only one rotational direction to cause the mechanical device to swing the wiper arm back and forth across the windshield. The mechanical device also defines the upper and lower limits of the range of motion. The upper and lower limits are set by calibrating the mechanical device. However, calibrating the mechanical device manually may be a time-consuming and laborious task. In addition, the drive system of many known wiper devices has a relatively large physical footprint, which may present challenges in the design and manufacture of the vehicle.

BRIEF DESCRIPTION

In one aspect, a method of calibrating a windshield wiper system is provided. The method includes moving a wiper arm, of the windshield wiper system, within at least a portion of a full range of motion defined by at least one physical boundary, determining a position of the wiper arm when it contacts the at least one physical boundary, defining, based on the determined position of the wiper arm, an operating range of motion for the wiper arm that is shorter than the full range of motion, and setting the wiper arm to operate within the defined operating range of motion.

In another aspect, a method of calibrating a windshield wiper system is provided. The method includes moving a wiper arm, of the windshield wiper system, within at least a portion of a full range of motion that includes an upper limit defined by a first physical boundary and a lower limit defined by a second physical boundary, determining a rotational position of the wiper arm when it contacts the first physical boundary or the second physical boundary, defining, based on the determined rotational position of the wiper arm, an operating range of motion for the wiper arm that is shorter than the full range of motion, and setting the wiper arm to operate within the defined operating range of motion.

In yet another aspect, a windshield wiper system for use with a vehicle is provided. The system includes a wiper arm movable in a full range of motion defined by at least one physical boundary on the vehicle, a motor configured to operate the wiper arm, and a controller in communication with the motor. The controller is configured to determine a position of the wiper arm when it contacts the at least one physical boundary, define, based on the determined position of the wiper arm, an operating range of motion for the wiper arm that is shorter than the full range of motion, and set the wiper arm to operate within the defined operating range of motion.

DETAILED DESCRIPTION

The embodiments described herein relate generally to systems and methods for setting an operating range of motion for windshield wiper systems. In the exemplary embodiment, the systems described herein include a wiper arm that is movable in a full range of motion defined by at least one physical boundary on a vehicle, a motor configured to operate the wiper arm, and a controller in communication with the motor. The movement of the wiper arm is directly controlled by the motor, in that the motor is rotatable in opposing directions to cause the wiper arm to be swung back and forth across a windshield of the vehicle. Thus, the systems and methods described herein enable the operating range of motion for the wiper arm to be automatically set and stored via electronic, rather than mechanical, means with the controller. As such, the systems and methods described herein provide for an accurate and mechanically simplified windshield wiper system having a reduced physical footprint within the vehicle.

Figure 1:
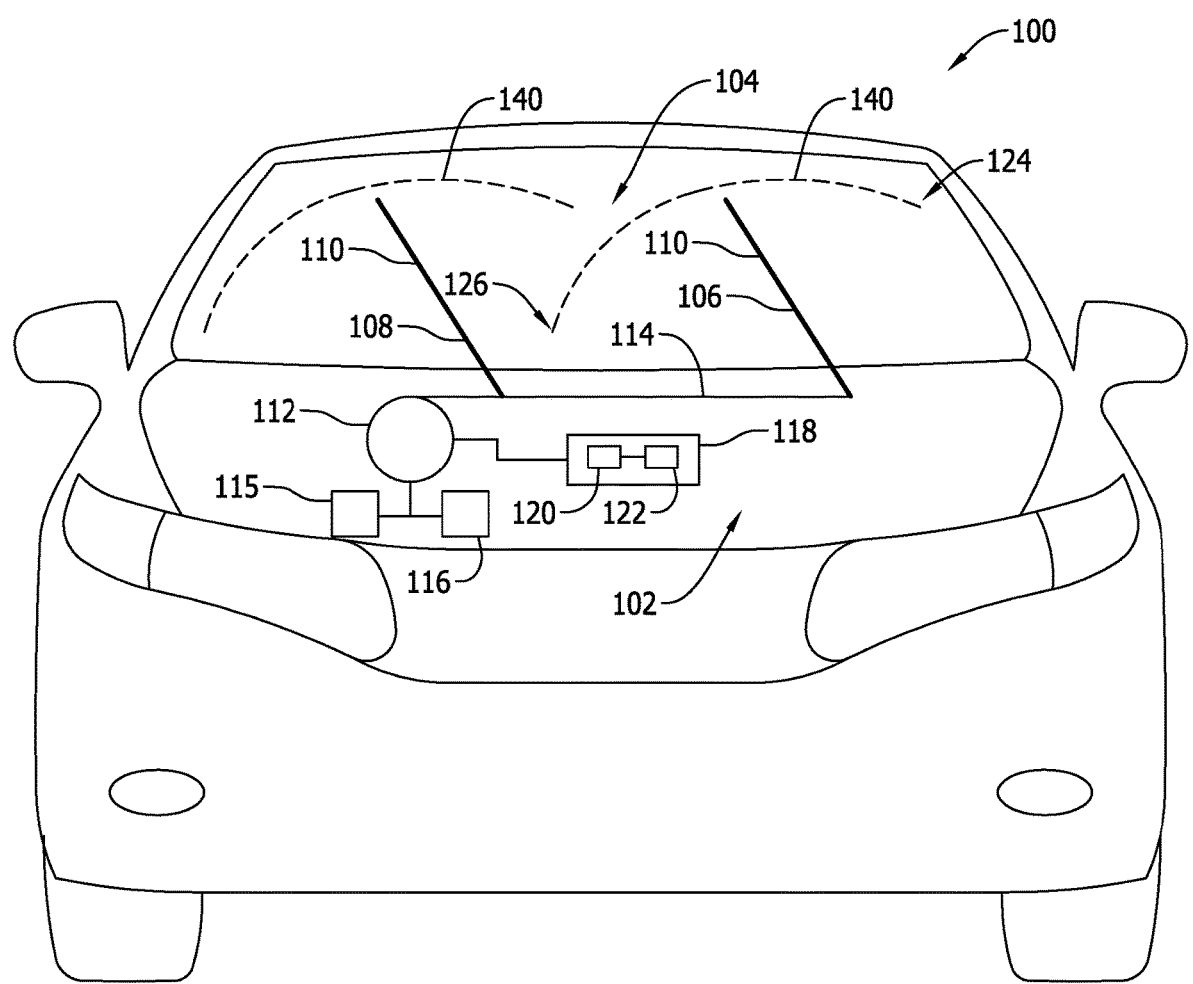
FIG. 1 is a front view of an exemplary vehicle including an exemplary windshield wiper system.

FIG. 1 is a front view of an exemplary vehicle 100 including an exemplary windshield wiper system 102. In the exemplary embodiment, vehicle 100 includes a windshield 104. Windshield wiper system 102 includes a driver side wiper arm 106 and a passenger side wiper arm 108. Wiper arms 106 and 108 can include a rubber blade 110 to wipe windshield 104 to cause the periodic removal of fluids therefrom. A connecting member 114 extends between wiper arms 106 and 108, and a motor 112 is coupled to connecting member 114. As such, in the exemplary embodiment, connecting member 114 enables motor 112 to actuate wiper arms 106 and 108 simultaneously. For example, in one embodiment, windshield wiper system 102 is a reversing-type wiper system in which motor 112 moves connecting member 114 in a first direction to cause wiper arms 106 and 108 to swing across windshield 104 in a first rotational direction, and that moves connecting member 114 is a second opposite direction to cause wiper arms 106 and 108 to swing across windshield 104 in a second opposite rotational direction. Accordingly, the translational movement of connecting member 114 in either the first direction or the second direction controls the range of motion of wiper arms 106 and 108. Thus, as will be explained in more detail below, the range of motion of wiper arms 106 and 108 is calibratable by a motor controller 115 coupled to motor 112. Alternatively, motor controller 115 may be included within motor 112. In an alternative embodiment, windshield wiper system 102 is a rotary-type system, and the range of motion of wiper arms 106 and 108 is calibratable by adjusting the starting and end points of motor rotation, for example.

In one embodiment, a sensor 116 is coupled to motor 112 and/or motor controller 115. Alternatively, sensor 116 may be included within either motor 112 and/or motor controller 115. As will be described in more detail below, sensor 116 is operable to determine when rotational motion of wiper arms 106 and 108 is impeded, and to generate a feedback response when the motion is impeded. In an alternative embodiment, sensor 116 is integrated as part of motor 112.

Windshield wiper system 102 also includes a controller 118 in communication with motor 112. Controller 118 includes a memory 120 and a processor 122, including hardware and software, coupled to memory 120 for executing programmed instructions. Processor 122 may include one or more processing units (e.g., in a multi-core configuration) and/or include a cryptographic accelerator (not shown). Controller 118 is programmable to perform one or more operations described herein by programming memory 120 and/or processor 122. For example, processor 122 may be programmed by encoding an operation as executable instructions and providing the executable instructions in memory 120.

Processor 122 may include, but is not limited to, a general purpose central processing unit (CPU), a microcontroller, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 122, cause processor 122 to perform at least a portion of the functions described herein. The above examples are exemplary only, and thus are not intended to limit in any way the definition and/or meaning of the term processor.

Memory 120 is one or more devices that enable information such as executable instructions and/or other data to be stored and retrieved. Memory 120 may include one or more computer-readable media, such as, without limitation, dynamic random access memory (DRAM), synchronous dynamic random access memory (SDRAM), static random access memory (SRAM), a solid state disk, and/or a hard disk. Memory 120 may be configured to store, without limitation, executable instructions, operating systems, applications, resources, installation scripts and/or any other type of data suitable for use with the methods and systems described herein.

Instructions for operating systems and applications are located in a functional form on non-transitory memory for execution by processor 122 to perform one or more of the processes described herein. These instructions in the different implementations may be embodied on different physical or tangible computer-readable media, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from controller 118 to permit access and/or execution by processor 122. In an alternative implementation, the computer-readable media is not removable.

It is to be understood that windshield wiper system 102 is a schematic illustration of an exemplary windshield wiper system of a vehicle and should not be construed to limit the type or operation of windshield wiper system contemplated in the disclosure. Accordingly, the disclosure applies equally to other windshield wiper systems, including those not illustrated or explicitly described.

Figure 2:
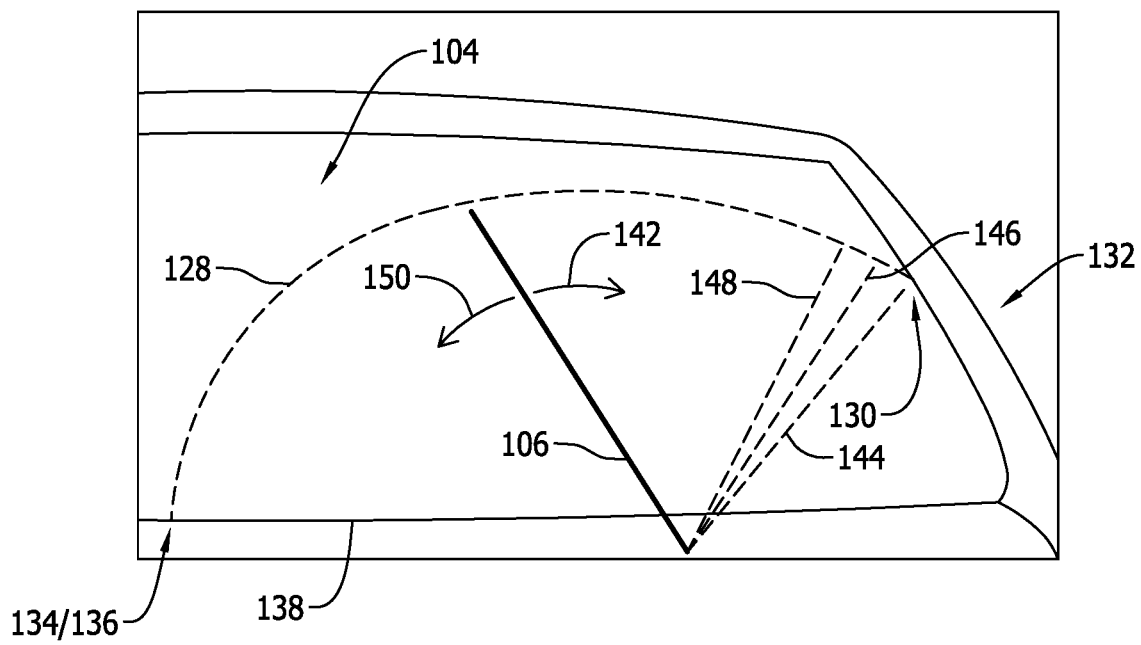
FIG. 2 illustrates an exemplary method of determining a first range limit for the windshield wiper system shown in FIG. 1.
Figure 3:
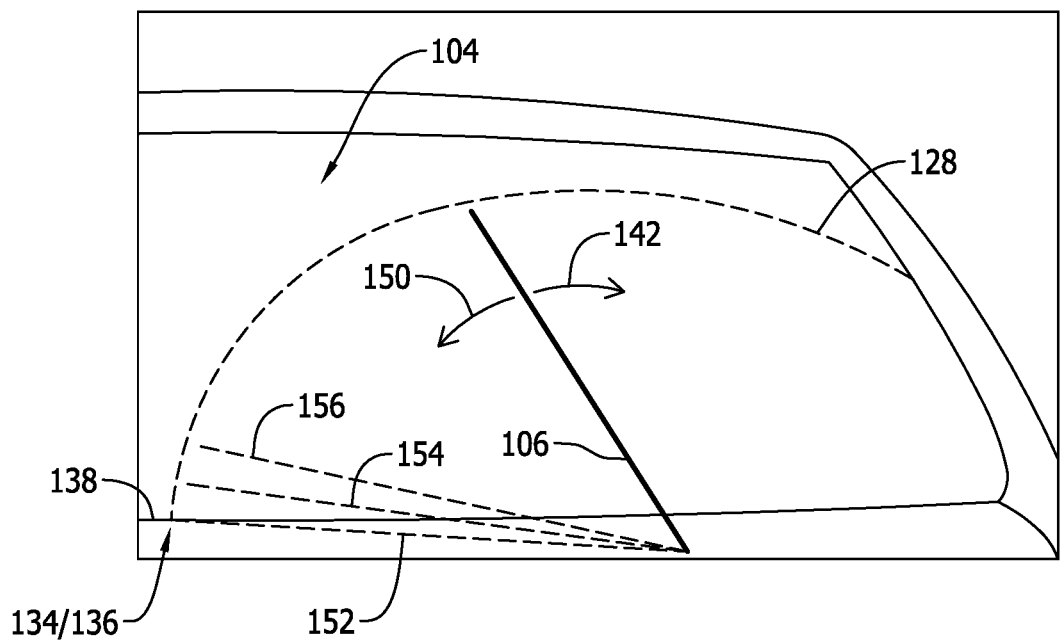
FIG. 3 illustrates an exemplary method of determining a second range limit for the windshield wiper system shown in FIG. 1.

FIGS. 2 and 3 illustrate an exemplary method of determining a first range limit 124 and a second range limit 126 for the windshield wiper system 102 (all shown in FIG. 1). The following method is described in the context of driver side wiper arm 106, but it should be understood that the calibration process described herein is likewise applicable to the movement of passenger side wiper arm 108. In the exemplary embodiment, driver side wiper arm 106 is moveable across windshield 104 within a full range of motion 128. Full range of motion 128 includes an upper limit 130 defined by a first physical boundary 132, and a lower limit 134 defined by a second physical boundary 136 on vehicle 100. In the exemplary embodiment, first physical boundary 132 is defined by an A-pillar of vehicle 100, and second physical boundary 136 is defined by a lower edge 138 of windshield 104.

In operation, controller 118 may be set to a calibration mode to enable an operating range of motion 140 (shown in FIG. 1) to be defined for wiper arm 106 that is shorter than full range of motion 128. For example, operating range of motion 140 may be defined between first range limit 124 and second range limit 126. When in the calibration mode, controller 118 controls motor 112 to cause driver side wiper arm 106 to perform a series of motions that enables the operating range of motion 140 to be determined based on feedback received during performance of the series of motions.

For example, referring to FIG. 2, the calibration process includes moving wiper arm 106 in a first direction 142 towards first physical boundary 132 and along at least a portion of full range of motion 128. Sensor 116 then determines a rotational position (i.e., positional data) of driver side wiper arm 106 when it contacts first physical boundary 132. A feedback response is then generated that indicates when contact is initiated with first physical boundary 132. When received by controller 118 (shown in FIG. 1), the feedback response also indicates that the next step in the calibration process should be initiated.

In one embodiment, wiper arm 106 is moved towards first physical boundary 132 to initiate contact therewith, and is then moved away from first physical boundary 132, to define a contact cycle. Multiple contact cycles, such as at least three contact cycles, may be performed. Positional data obtained from each contact cycle may be stored in memory 120 and analyzed to determine and verify the rotational position of wiper arm 106 when it contacts first physical boundary 132. Determining and verifying the rotational position enables a baseline rotational position to be established from which first range limit 124 may be determined. As will be described in more detail below, first range limit 124 is offset from upper limit 130 (i.e., the baseline rotational position) by a predetermined distance or rotational degree. In one embodiment, the analysis may include defining the baseline rotational positional data of wiper arm 106 when contact is first initiated, comparing the baseline rotational position to positional data obtained from the subsequent contact cycles, and confirming the baseline rotational position based on the comparison.

The series of motions are performed in accordance with variable rates of speed and distinct idling positions of wiper arm 106. For example, when in the calibration mode, full range of motion 128 may be defined by a first idling position 144 defined when wiper arm 106 is in contact with first physical boundary 132, a second idling position 146 offset a first distance from upper limit 130, and a third idling position 148 offset a second greater distance from upper limit 130. In one embodiment, in operation, wiper arm 106 is initially moved in first direction 142 at a first rate of speed towards third idling position 148, and then moved in first direction 142 at a second rate of speed from third idling position 148 towards first idling position 144. The second rate of speed is less than the first rate of speed. The first rate of speed is selected to reduce the amount of time needed to perform the calibration, and the second rate of speed is selected to reduce the likelihood of damage to vehicle 100 that may be caused from initiating contact between components thereof. In addition, moving wiper arm 106 towards first idling position 144 at the second reduced rate of speed may enhance the accuracy of the positional data obtained from the motion.

As described above, multiple contact cycles may be performed to obtain addition positional data. For example, in operation, wiper arm 106 is moved in a second direction 150 from first idling position 144 towards second idling position 146 to define the contact cycle. Second idling position 146 is a shorter distance from upper limit 130 than third idling position 148 to shorten the travel distance of wiper arm 106 when performing the contact cycles, and to reduce the amount of time needed to perform the calibration. The subsequent contact cycles may be performed at the reduced rate of speed.

Controller 118 is programmed to automatically determine first range limit 124 based on the positional data obtained from the one or more contact cycles. For example, first range limit 124 is determined by reducing the range of motion of wiper arm 106 by a predetermined distance or rotational degree. In other words, controller 118 limits the range of motion in which wiper arm 106 may operate. As such, first range limit 124 is offset from upper limit 130 by the predetermined distance or rotational degree, which is selected such that a gap is defined between upper limit 130 and first range limit 124. First range limit 124 may be stored within controller 118 for future use. For example, controller 118 may set wiper arm 106 to operate with operating range of motion defined by first range limit 124.

Referring to FIG. 3, after first range limit 124 has been determined, the calibration process also includes moving wiper arm 106 in second direction 150 towards second physical boundary 136 within at least a portion of full range of motion 128. Sensor 116 then determines a rotational position (i.e., positional data) of driver side wiper arm 106 when it contacts second physical boundary 136, and generates a feedback response. Similar to the process steps for determining first range limit 124, multiple contact cycles may be performed when determining second range limit 126. For example, when in the calibration mode, full range of motion 128 may be defined by a first idling position 152 defined when wiper arm 106 contacts second physical boundary 136, a second idling position 154 offset a first distance from lower limit 134, and a third idling position 156 offset a second greater distance from lower limit 134. The series of motions used to determine first range limit 124 may be used to determine second range limit 126. For example, second range limit 126 is determined by reducing the range of motion of wiper arm 106 by a predetermined distance or rotational degree, which may be the same or different from the predetermined distance or rotational degree used to determine first range limit 124. Controller 118 may then set wiper arm 106 to operate with a range of motion defined by first range limit 124 and second range limit 126 (i.e., operating range of motion 140).

Figure 4:
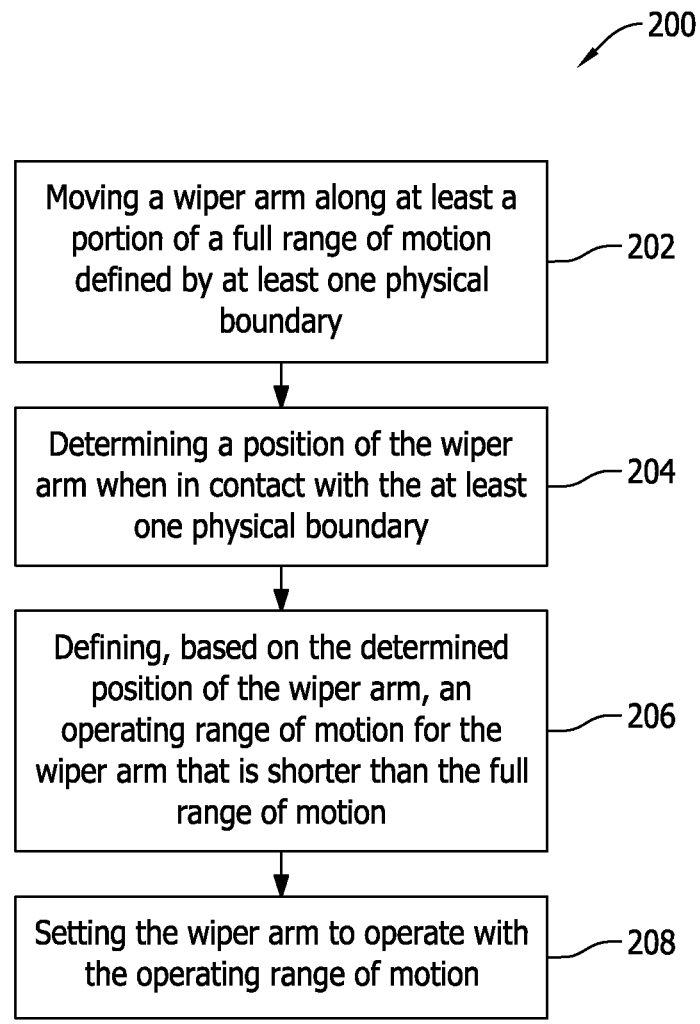
FIG. 4 is a flow diagram illustrating an exemplary method of calibrating the windshield wiper system shown in FIG. 1.

FIG. 4 is a flow diagram illustrating an exemplary method 200 of calibrating windshield wiper system 102 (shown in FIG. 1). In the exemplary embodiment, method 200 includes moving 202 a wiper arm, of the windshield wiper system, within at least a portion of a full range of motion that includes an upper limit defined by a first physical boundary and a lower limit defined by a second physical boundary, determining 204 a rotational position of the wiper arm when it contacts the first physical boundary or the second physical boundary, defining 206, based on the determined rotational position of the wiper arm, an operating range of motion for the wiper arm that is shorter than the full range of motion, and setting 208 the wiper arm to operate with the operating range of motion.

The embodiments described herein relate to systems and methods for setting an operating range of motion for windshield wiper systems. The systems and methods described herein accomplish the aforementioned objective by performing a calibration process that automatically determines the rotational limits of the wiper arms, and determines an operating range of motion for the wiper arm that is shortened from relative to the full range of motion defined by the rotational limits. Thus, the systems and methods described herein enable the operating range of motion for the wiper arm to be automatically set and stored via electronic, rather than mechanical, means with the controller.

Exemplary embodiments of windshield wiper systems are described above in detail. Although the systems herein are described and illustrated in association with a motor vehicle, the invention is also intended for use in any vehicle having a windshield wiper system. Moreover, it should also be noted that the components of the invention are not limited to the specific embodiments described herein, but rather, aspects of each component may be utilized independently and separately from other components and methods described herein.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of calibrating a windshield wiper system, the method comprising:
   moving a wiper arm, of the windshield wiper system, at a first rate of speed towards at least one physical boundary and within at least a portion of a full range of motion defined by the at least one physical boundary;
   determining a position of the wiper arm after movement at the first rate of speed when it the wiper arm contacts the at least one physical boundary;
   moving the wiper arm, of the windshield wiper system, at a second rate of speed towards the at least one physical boundary, wherein the second rate of speed is different than the first rate of speed;

determining a position of the wiper arm after movement at the second rate of speed towards the at least one physical boundary;
defining, based on each determined position of the wiper arm, an operating range of motion for the wiper arm that is shorter than the full range of motion; and
setting the wiper arm to operate within the defined operating range of motion.

2. The method in accordance with claim 1, wherein defining an operating range of motion comprises determining at least one range limit for the wiper arm, wherein the at least one range limit is offset from the determined position of the wiper arm by a predetermined distance.

3. The method in accordance with claim 2, wherein determining at least one range limit comprises:
setting a first range limit for the wiper arm, wherein the first range limit is offset from an upper limit of the full range of motion by the predetermined distance; and
setting a second range limit for the wiper arm, wherein the second range limit is offset from a lower limit of the full range of motion by the predetermined distance.

4. The method in accordance with claim 2, wherein setting the wiper arm comprises storing the at least one range limit within a controller associated with the wiper arm.

5. The method in accordance with claim 1, wherein determining a position of the wiper arm comprises:
moving the wiper arm towards the at least one physical boundary to initiate contact therewith;
moving the wiper arm away from the at least one physical boundary, the moving steps defining a contact cycle;
performing multiple contact cycles, wherein positional data is obtained from each contact cycle; and
determining the position of the wiper arm based on an analysis of the positional data.

6. The method in accordance with claim 1, wherein determining a position of the wiper arm comprises:
determining a position of the wiper arm as it is moved at the first rate of speed towards a first position defined within the full range of motion, wherein the first position is offset from the at least one physical boundary by a predetermined distance; and
determining a position of the wiper arm as it is moved at the second rate of speed from the first position towards the at least one physical boundary, wherein the second rate of speed is less than the first rate of speed.

7. The method in accordance with claim 1, wherein determining a position of the wiper arm comprises receiving a feedback response from a motor configured to operate the wiper arm, the feedback response indicating contact has been initiated with the at least one physical boundary.

8. A method of calibrating a windshield wiper system, the method comprising:
moving a wiper arm, of the windshield wiper system, at a first rate of speed within at least a portion of a full range of motion that includes an upper limit defined by a first physical boundary and a lower limit defined by a second physical boundary;
determining a rotational position of the wiper arm after movement at the first rate of speed when it contacts the first physical boundary or the second physical boundary;
moving the wiper arm, of the windshield wiper system, at a second rate of speed towards one of the first physical boundary and the second physical boundary;
determining a rotational position of the wiper arm after movement at the second rate of speed when it contacts the first physical boundary or the second physical boundary;
defining, based on the each determined rotational position of the wiper arm, an operating range of motion for the wiper arm that is shorter than the full range of motion; and
setting the wiper arm to operate within the defined operating range of motion.

9. The method in accordance with claim 8, wherein defining an operating range of motion comprises determining at least one range limit for the wiper arm, wherein the at least one range limit is offset from the determined degree of rotation by a predetermined number of degrees.

10. The method in accordance with claim 9, wherein determining at least one range limit comprises:
setting a first range limit for the wiper arm, wherein the first range limit is offset from the upper limit of the full range of motion by the predetermined number of degrees; and
setting a second range limit for the wiper arm, wherein the second range limit is offset from the lower limit of the full range of motion by the predetermined number of degrees.

11. The method in accordance with claim 9, wherein setting the wiper arm comprises storing the at least one range limit within a controller associated with the wiper arm.

12. The method in accordance with claim 8, wherein determining a position of the wiper arm comprises:
moving the wiper arm towards the first physical boundary or the second physical boundary to initiate contact therewith;
moving the wiper arm away from the first physical boundary or the second physical boundary, the moving steps defining a contact cycle;
performing multiple contact cycles, wherein positional data is obtained from each contact cycle; and
determining the rotational position of the wiper arm based on an analysis of the positional data.

13. The method in accordance with claim 8, wherein determining a rotational position of the wiper arm comprises:
determining a rotational position of the wiper arm after moving the wiper arm at the first rate of speed towards a first position defined within the full range of motion, wherein the first position is offset from one of the first physical boundary or the second physical boundary by a predetermined degree of rotation; and
determining a rotational position of the wiper arm after moving the wiper arm at the second rate of speed from the first position towards the one of the first physical boundary or the second physical boundary, wherein the second rate of speed is less than the first rate of speed.

14. The method in accordance with claim 8, wherein determining a rotational position of the wiper arm comprises receiving a feedback response from a motor configured to operate the wiper arm, the feedback response indicating contact has been initiated with the first physical boundary or the second physical boundary.

* * * * *